(12) United States Patent
Dunham et al.

(10) Patent No.: US 6,536,650 B1
(45) Date of Patent: Mar. 25, 2003

(54) SELF-GROUNDING SOLDERING IRON TIP ARRANGEMENT AND A SOLDERING IRON FOR USE THEREWITH

(75) Inventors: Paul Alan Dunham, Milton Keynes (GB); William Jordan Siegel, Bethesda, MD (US); John Franklin Wood, New Windsor, MD (US); Gary Silas Sines, Woodbine, MD (US); Dung T. Le, Silver Spring, MD (US); David L. Gilbert, Laurel, MD (US); Jeffrey Alan Snell, Abingdon, MD (US)

(73) Assignee: Pace, Incorporated, Annapolis Junction, MD (US)

( * ) Notice: Subject to any disclaimer, the term of this patent is extended or adjusted under 35 U.S.C. 154(b) by 0 days.

(21) Appl. No.: 09/973,952

(22) Filed: Oct. 11, 2001

(51) Int. Cl.[7] .................................................. B23K 3/00
(52) U.S. Cl. .......................... 228/51; 228/55; 219/229; 219/238
(58) Field of Search ............................ 228/51, 52, 53, 228/54, 55; 219/229, 238

(56) References Cited

U.S. PATENT DOCUMENTS

| 3,558,854 | A | * | 1/1971 | Siegel et al. ................ 219/233 |
| 3,899,114 | A | | 8/1975 | Kleeberg |
| 4,055,744 | A | * | 10/1977 | Fortune ....................... 219/239 |
| 4,136,275 | A | * | 1/1979 | McCullough ............... 219/230 |
| 4,602,144 | A | * | 7/1986 | Vogel .......................... 219/230 |
| 4,699,308 | A | * | 10/1987 | Wigley et al. ................ 228/19 |
| 4,873,608 | A | * | 10/1989 | Yoshimura ................... 361/220 |
| 4,903,884 | A | | 2/1990 | Royston et al. |
| 5,059,769 | A | | 10/1991 | Fortune |
| 5,062,564 | A | * | 11/1991 | Urban ............................ 228/9 |
| 5,151,574 | A | * | 9/1992 | Urban ......................... 219/241 |
| 5,329,085 | A | * | 7/1994 | Cowell et al. .............. 219/616 |
| 5,683,603 | A | | 11/1997 | Fortune |
| 5,796,072 | A | * | 8/1998 | Okuno ........................ 219/229 |
| 5,837,973 | A | | 11/1998 | Tamura |

FOREIGN PATENT DOCUMENTS

JP           404351268 A     * 12/1992

* cited by examiner

Primary Examiner—Tom Dunn
Assistant Examiner—Kiley Stoner
(74) Attorney, Agent, or Firm—Nixon Peabody LLP; David S. Safran

(57) ABSTRACT

A self-grounding soldering tip having a spring which serves for connecting the soldering tip to a heater bobbin for establishing a secure grounding of the soldering tip. A bobbin tube extends within the heater bobbin for removably retaining the soldering tip within the bobbin. The connection between the spring and bobbin tube provide tip-to-ground continuity. Moreover, the contact surfaces of the spring and bobbin tube are wiped clean upon plug-in and plug-out. The spring and bobbin tube are located in a cooler area of the soldering iron to slow down the rate of oxidation. Also, the spring and bobbin tube are made of the same or compatible materials, e.g., stainless steel, to prevent reactions that normally occur between incompatible metals.

18 Claims, 8 Drawing Sheets

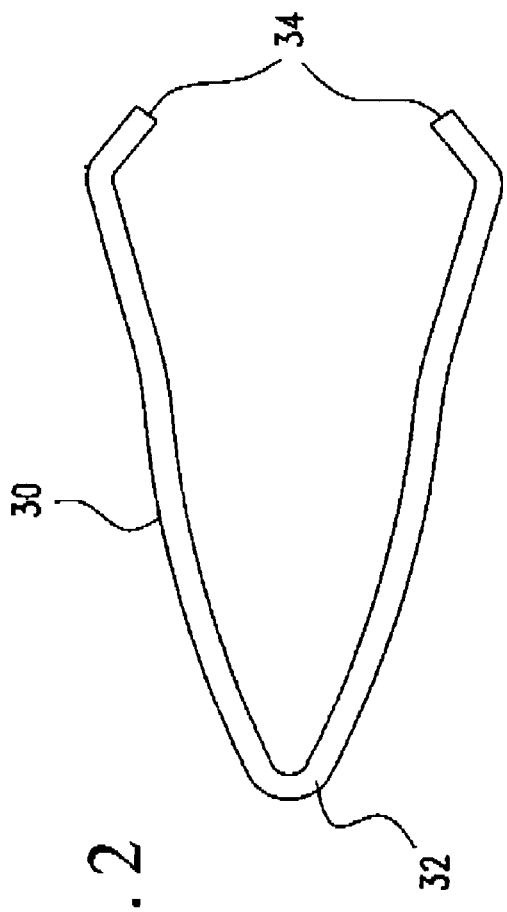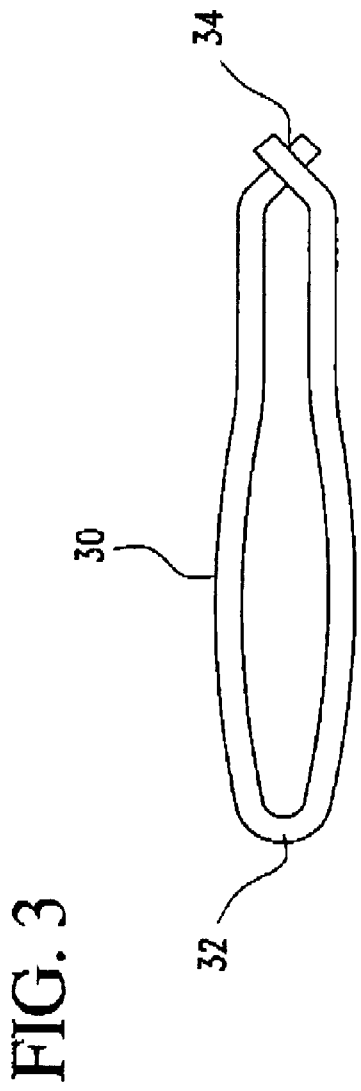
FIG. 2
FIG. 3

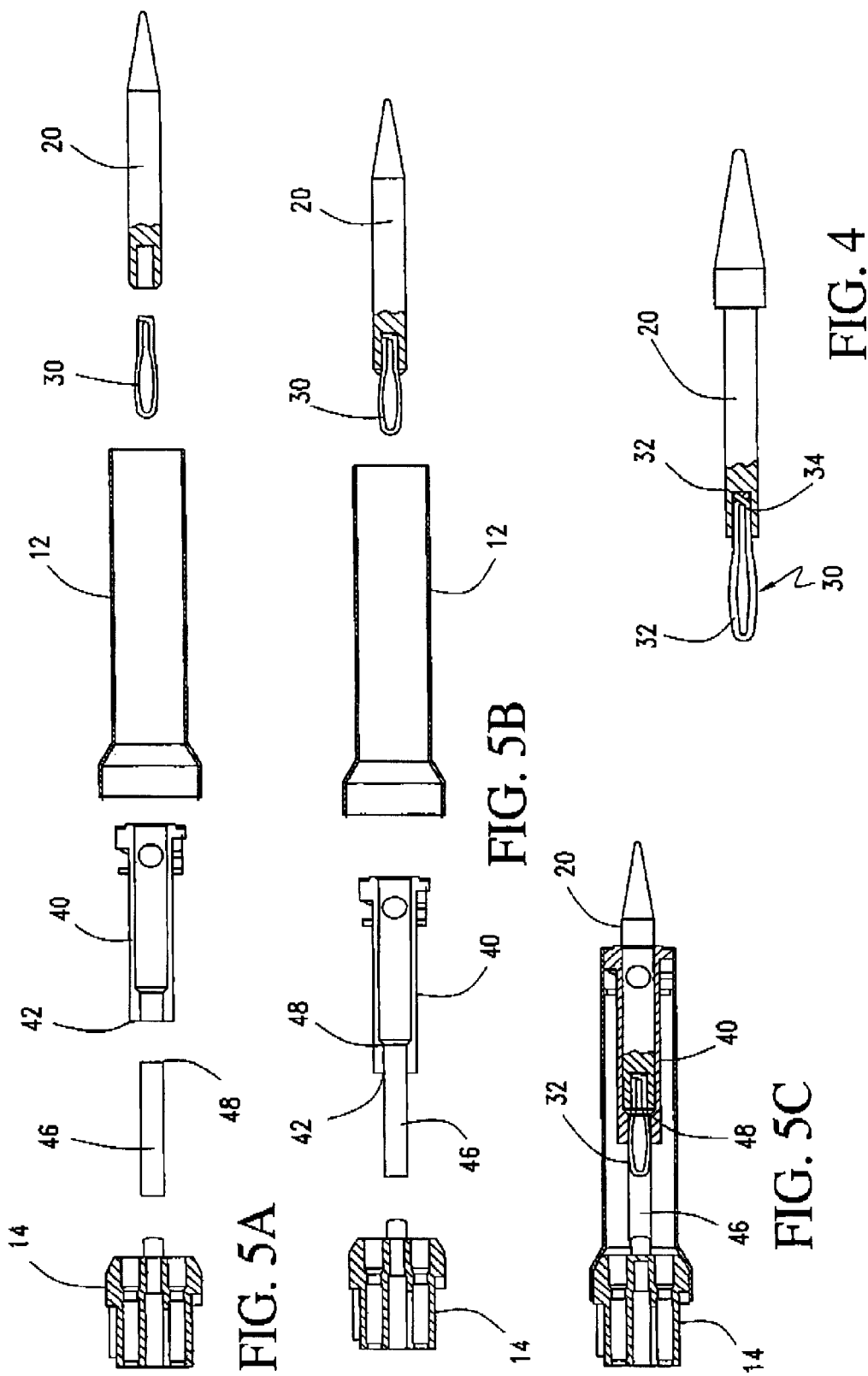

SELF-GROUNDING SOLDERING IRON TIP ARRANGEMENT AND A SOLDERING IRON FOR USE THEREWITH

BACKGROUND OF THE INVENTION

1. Field of the Invention

The present invention relates to a self-grounding soldering iron tip, and more particularly, to a replaceable soldering tip arrangement with improved tip-to-ground continuity as well as a means for retaining the tip in the soldering iron to a soldering iron for use therewith.

2. Description of the Related Art

In one traditional soldering iron and soldering tip arrangement, the soldering tip is removably secured by means of a laterally threaded set screw. The screw digs into the tip, maintaining ground between the tip and the barrel of the soldering apparatus. In another traditional soldering iron and soldering tip arrangement, such as that found in WELLER® Brand products (COOPER INDUSTRIES INC.), including the WTCP and EC Series of Soldering Stations, tip retention and ground continuity is achieved through the use of a draw bar and nut arrangement in which the soldering tip fits onto a heater and a drawbar fits over the tip and is fastened to the soldering iron heater with a nut. In this arrangement, tip grounding is maintained via the contact between the draw bar flange and a shoulder on the tip, and/or the back or internal portions of the tip contacting grounded metal members of the soldering iron heater. Also known is the use of a grounded hardened steel spike which digs into the back end of the tip as it is tightened down with a draw bar; see, the UNICON 107 Model Soldering Station by Japan Unix Co., Ltd of Japan. A significant problem with such arrangements is the failure of ground which occurs with use. Also, set screws can become worn, making replacement necessary. Still further, it is not possible to simply plug in and begin use of the soldering iron due to the need to perform at least one fastening operation, such as tightening of a set screw or tightening down of a draw bar, etc.

When all of the components get hot during use, oxides build up and the ground at the tip is lost, requiring a thorough cleaning of the heater and replacement of the tip. Moreover, the ground connection is located in the vicinity of the heat source and oxidation occurs more rapidly in this heated area. Another problem with the prior art arrangements is flux/solvent fume contamination. Often, the tip and setting screws or holding means are made of incompatible materials which also cause a reaction due to the dissimilarity or incompatibility of the metals.

Maintaining ground at the tip is important to help prevent the soldering iron from causing EOS/ESD damage to sensitive electronic assemblies. At present, the relevant specifications require resistance between the tip and ground to be no greater than 5 ohms. Moreover, ANSI-JSTD-001 guidelines for soldering irons require that ground is maintained.

Hence, there is a need for a removable soldering tip which provides retention of the tip and a positive, reliable ground connection which is less susceptible to failure due to oxidation, contamination or corrosion. Likewise, it is desirable to achieve these benefits without having to perform a tightening or fastening operation each time a tip is attached to the soldering iron.

SUMMARY OF THE INVENTION

Accordingly, it is a primary object of the present invention to provide an easily removable, but securely attached soldering tip which provides improved electrical contact between the tip and the apparatus.

Another object of the present invention is to provide a soldering tip arrangement in which the ground connection is located remote from the heat source, solder flux fumes and other contamination to slow down the rate of oxidation.

Still another object of the present invention is to provide a soldering tip arrangement in which the ground contact surfaces are wiped clean each time plug-in or plug-out of the tip occurs.

It is also an object of the present invention to provide a soldering tip arrangement wherein the ground contact surfaces are made of the same or compatible materials, so as to avoid reactions that occur between dissimilar incompatible metals.

In accomplishing these and other objectives of the invention, there is provided a self-grounding soldering tip arrangement having a soldering tip and a heater bobbin for receiving the soldering tip. A bobbin tube extends within the heater bobbin, and spring means removably retain the soldering tip within the bobbin. The spring means has a first end connectable with the soldering tip and a second end connectable with the bobbin tube. The connection between the spring means and bobbin tube provides tip-to-ground continuity.

The spring means and bobbin tube are made of the same or compatible materials and hence avoid any reactions that occur between dissimilar or incompatible metals. Moreover, the spring and bobbin tube ground connection is located in a relatively cool location remote from the heat source to slow down oxidation.

Other features and advantages of the present invention will become apparent from the following description of the invention which refers to the accompanying drawings.

BRIEF DESCRIPTION OF THE DRAWINGS

FIG. 2 illustrates the ground spring of FIG. 1 in a free form state.

FIG. 3 illustrates the ground spring of FIG. 1 in an assembled form.

FIG. 4 is a partial cross-sectinal view of the tip and ground spring of FIG. 1.

FIGS. 5A & 5B are fully and partially exploded views, partially in longitudinal cross section, of the tip arrangement of FIG. 1.

FIG. 5C is longitudinal cross sectional view of the tip arrangement in a fully assembled state.

DETAILED DESCRIPTION OF THE INVENTION

Figure 1:
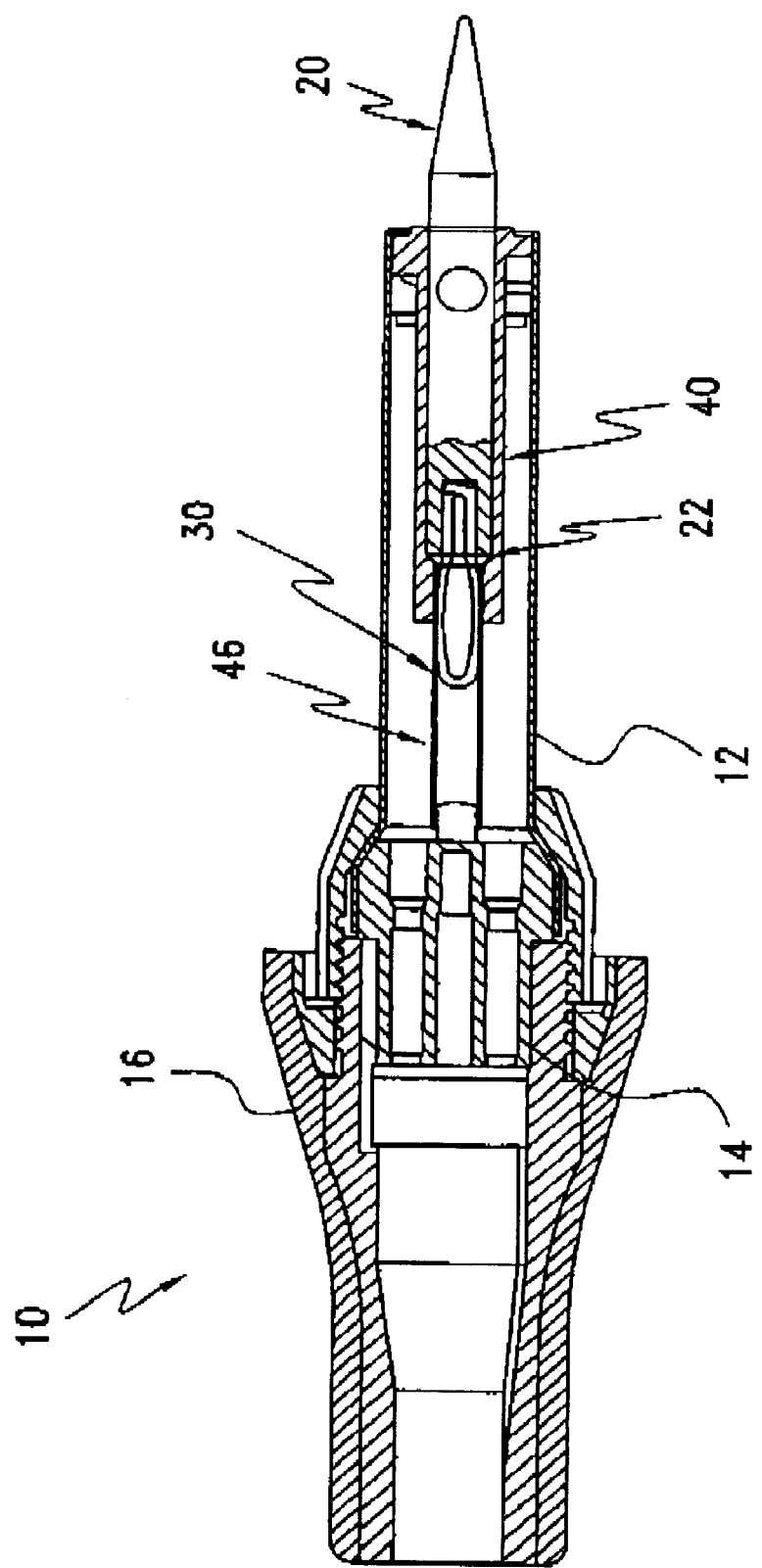
FIG. 1 is a longitudinal cross-sectional view of a soldering iron incorporating the self-grounding soldering tip arrangement according to a first embodiment of the present invention.

Referring to FIG. 1, a soldering tool 10 having a tip arrangement of the present invention is shown. The tip arrangement includes a plated copper soldering tip 20 which receives a ground spring 30, which will be described further herein. When assembled, tip 20 extends into a heater bobbin 40. A bobbin tube 46 extends into bobbin 40, so as to receive the free end of spring 30. This arrangement provides a plug-in/plug-out tip retention within the heater bobbin, the spring being slightly compressed as it enters the bobbin tube 46.

A cover or shroud 12 protects heater bobbin 40 and bobbin tube 46. The working end of tip 20 extends from one end of cover 12. A second end of cover 12 receives a plug 14 and both components are located attached to a handle portion 16 of soldering tool 10. Plug 14 contains the electrical connections for the heater bobbin and advantageously is a replaceable element.

Ground spring 30 comprises a flattened loop of springy of wire of stainless steel or other suitable material crimped into the back of the plated copper soldering tip 20. As shown more clearly in FIGS. 2 & 3, the spring 30 is in the shape of a loop 32 and has opposed ends 34. Ends 34 are slightly bent inward and when compressed, as shown in FIG. 3, cross each other. It should be appreciated that other materials may be used, however, the metals in the bobbin tube and spring should be the same or otherwise compatible to avoid a reaction between them.

Referring to FIG. 4, when the tip arrangement is assembled, ends 34 are inserted into an aperture 22 in the spring receiving end of tip 20, followed by a swaging process on the tip 20 at aperature 22 which causes the ends of the spring to securely engage the walls of aperture 22 both electrically and mechanically. Loop 32 extends into end 48 of bobbin tube 46, as shown in FIGS. 1 & 5C. Bobbin tube: 46, like spring 30, is made of stainless steel or other suitable material. End 48 of bobbin tube 46 is received within a back end 42 of heater bobbin 40, as shown in FIGS. 5A & 5B. Thus, when the tip 20 and spring 30 are inserted fully into the heater bobbin 40, compression of the loop 32 by the stainless steel tube 46 creates a sufficient holding force, not only for retention of the tip without the need for a set screw, but also so as to create a positive, reliable ground connection which is less susceptible to failure from contamination, oxidation or corrosion. It should be appreciated that a set screw can be provided in addition to the ground spring connection; however, the provision of the set screw is an additional optional securing means that is not a necessary part of the invention.

As both spring 30 and tube 46 are made of stainless steel or other compatible materials (i.e., INCONEL), the use of the same or compatible materials avoids the reaction that occurs with dissimilar incompatible metals in elevated temperature environment of a soldering iron. Moreover, because ground spring 30 is located further away from the heat source, and hence cooler, oxidation will occur at a slower rate. Also, ground spring 30 is better protected from exposure to corrosive flux and solvent fumes than the actual tip 20. Importantly, the forced plugging in and out of ground spring 30 into and out of bobbin tube 46 wipes the contact surfaces clean each time.

Figure 6:
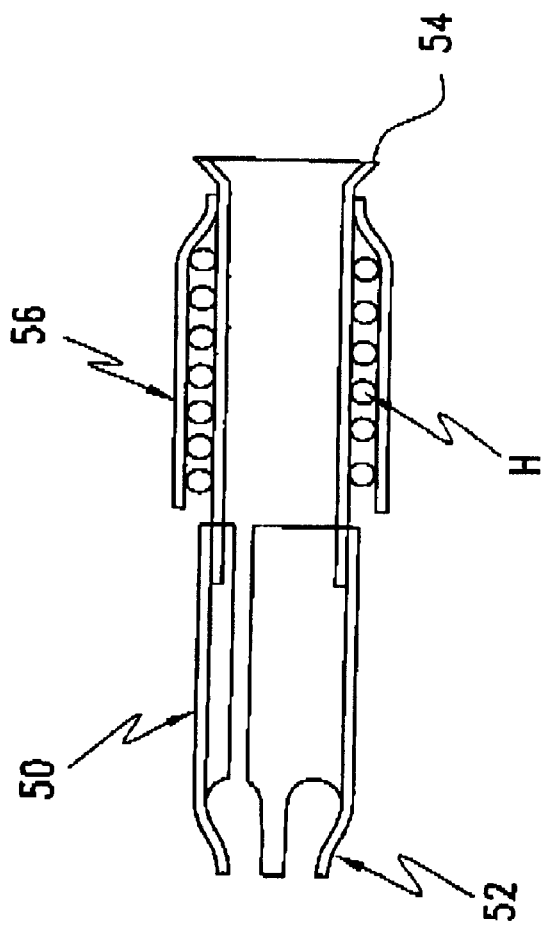
FIG. 6 is a cross-sectional view of a heater bobbin and ground spring according to a second embodiment of the present invention.
Figure 7:
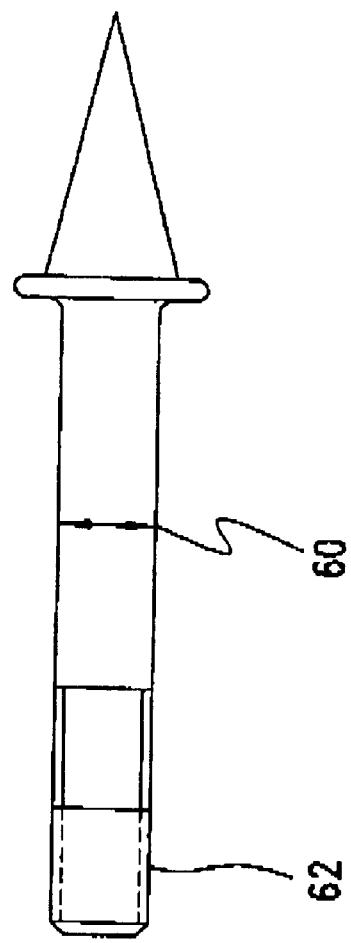
FIG. 7 is an elevational view of a soldering tip for use with the heater bobbin of FIG. 6.

Referring to FIGS. 6 & 7, an embodiment of the present invention which includes an extension spring 50 which has a plurality of spring fingers 52. Spring 50 is wrapped about and spring welded at one end to a heater bobbin 54. A shroud 56 is in turn welded to bobbin 54 and encloses the heating wire H. A tip 60 is swaged at one end 62. When assembled (the tip, oriented as in FIG. 7, being inserted into the bobbin from right to left as shown in FIG. 6), the swaged end 62 is received by spring fingers 52 and retained thereby. Therefore, the length of spring extension corresponds to the length of swaged end 62. Moreover, the fingers 52 serve to ground the tip 60 and extend into a cool zone, hence, oxidation occurs at a slower rate.

Figure 8C:
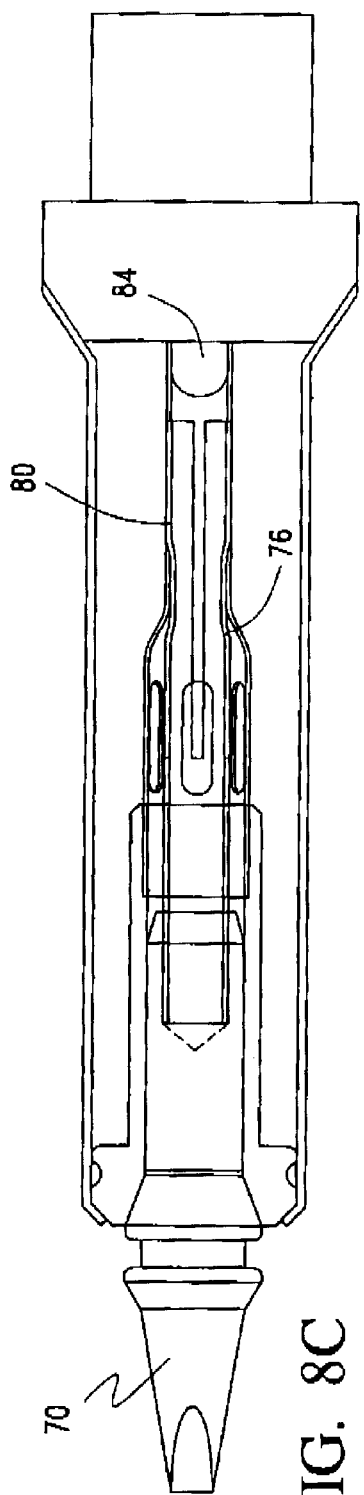
FIGS. 8A–8C are cross-sectional views of the tip arrangement of a third embodiment of the present invention.
Figure 8A:
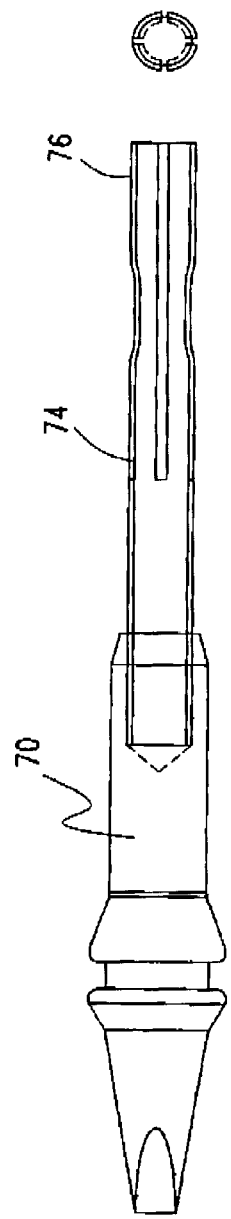
Figure 8B:
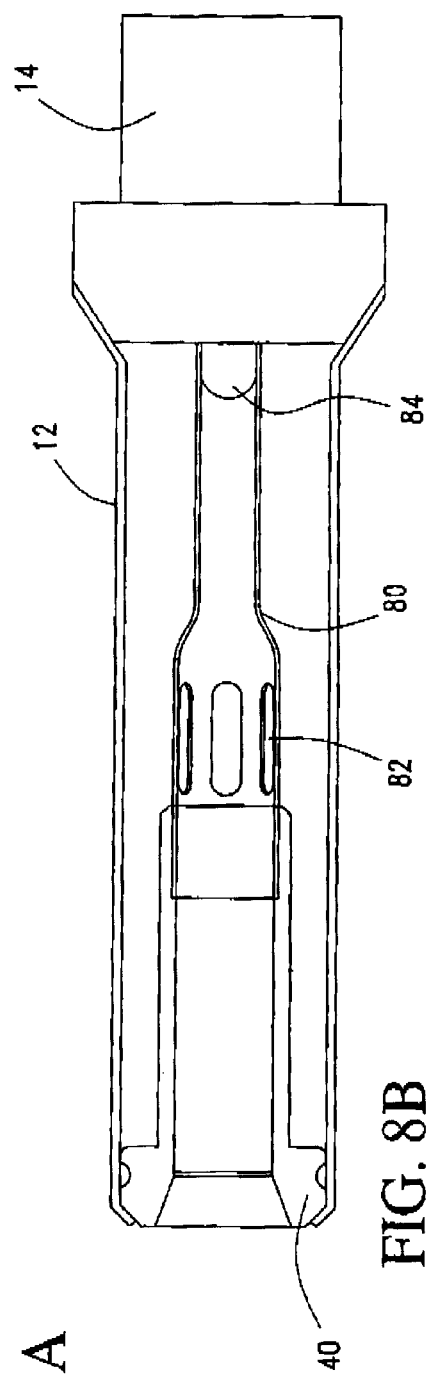

FIG. 8A illustrates another embodiment of a soldering tip 70 which receives a ground spring 74. Ground spring 74 includes fingers 76. Referring to FIGS. 8B & 8C, a bobbin tube 80 includes a plurality of slots 82. When spring 74 is inserted into tube 80, slots 82 will enable the tube to expand and then retract to engage spring 74 therein. Once again the contact zone is located remote from the heat source to prevent buildup of oxidation.

Figure 9C:
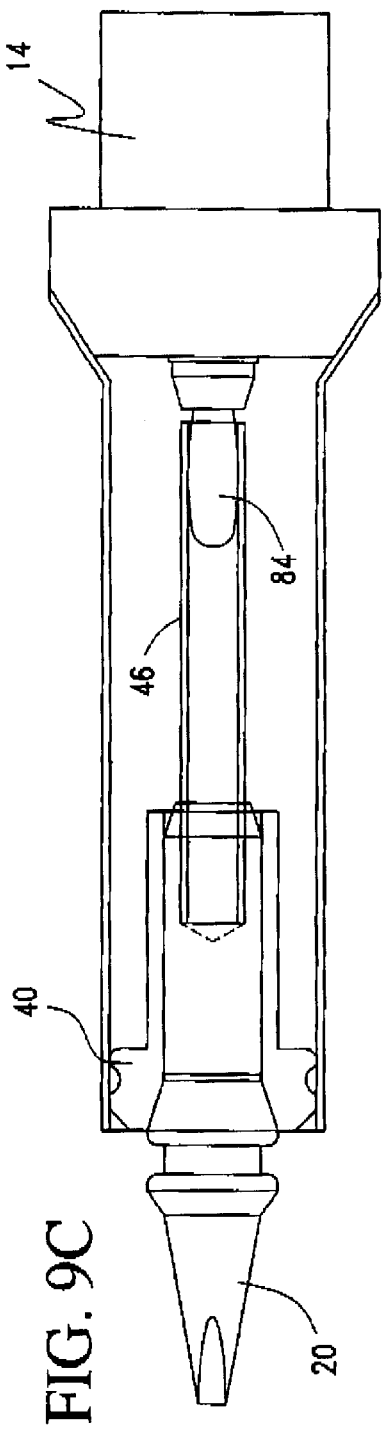
FIGS. 9A–9D are cross-sectional views of a forth embodiment of the tip arrangement of the present invention.
Figure 9A:
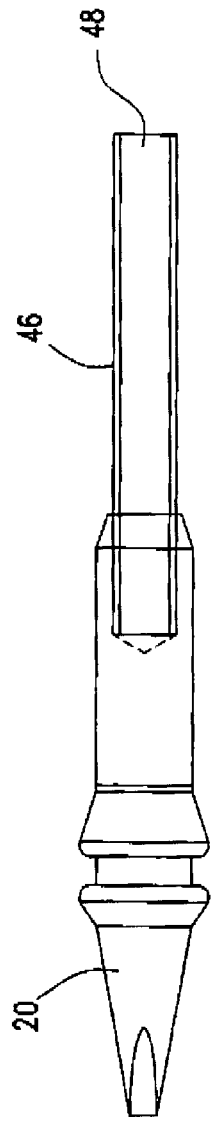
Figure 9B:
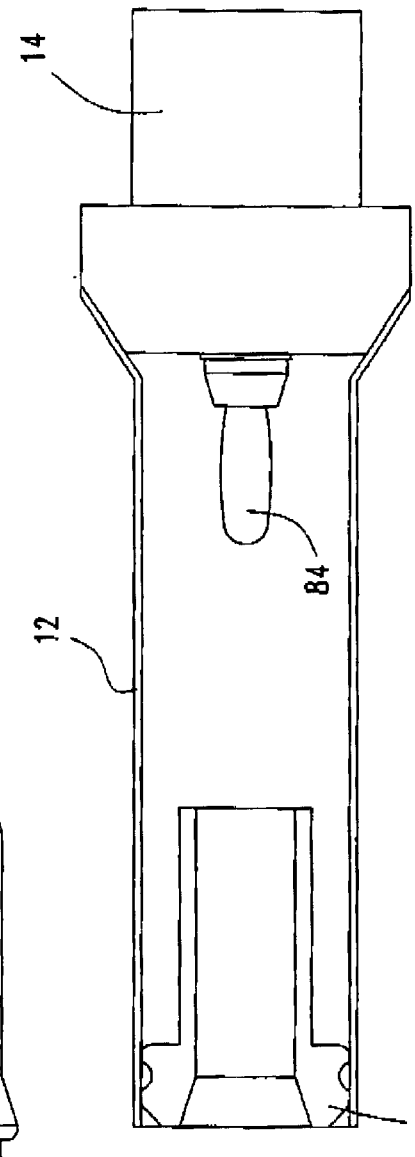
Figure 9D:
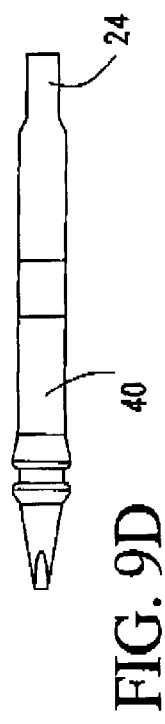

In still another embodiment of the present invention, as shown in FIGS. 9A–9C, tip 20 receives a bobbin tube 46 in one end thereof. A ground pin member 84 extends from plug 14, such that when the tip and bobbin tube are inserted all the way through bobbin 40, the pin 84 engages within the back end 48 of tube 46 and retains the connection. As shown in FIG. 9D, the bobbin tube can be eliminated by providing an elongated tip with an end 24 which itself receives the pin 84 upon assembly.

Like the previous embodiments, pin member 84 and bobbin tube 46 are both made of the same or compatible materials, for example, stainless steel, and this use of the same or compatible materials for both ground establishing parts prevents the reaction which occurs with dissimilar incompatible metals. As illustrated, ground pin member 84 is located remote from the heat source, reducing oxidation. Also, the plug-in/plug-out action of the ground pin member 84 and tube 46 wipes the contact surfaces each time.

Figure 10:
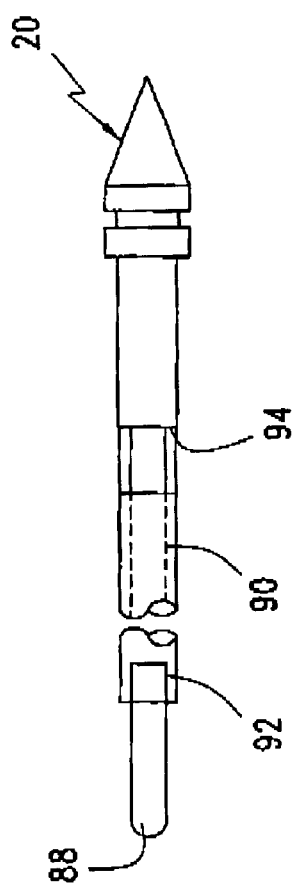
FIG. 10 is a partially broken-away and sectioned view of a tip and bobbin tube according to another embodiment of the present invention.
Figure 12A:
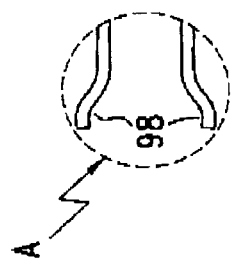
FIG. 12A is an enlarged cross-section of an alternative end of the bobbin according to the embodiment of FIGS. 10–12.
Figure 12:
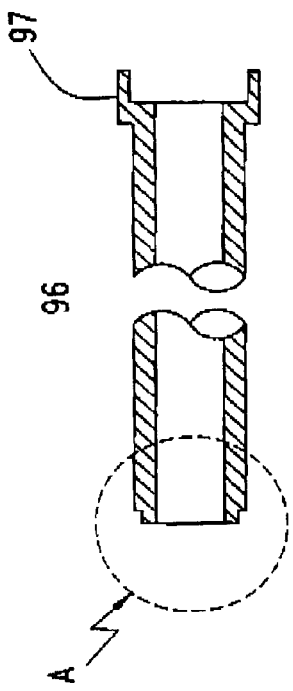
FIG. 12 is a cross-sectional view of another bobbin according to the embodiment of FIG. 10.
Figure 11:
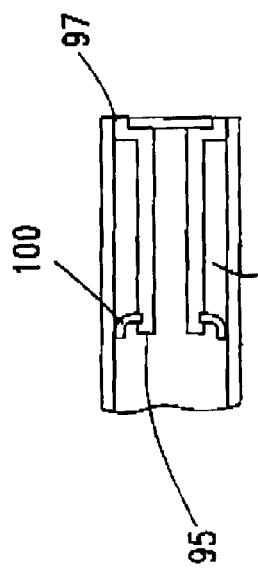
FIG. 11 is a cross-sectional view of a bobbin and cover according to the embodiment of FIG. 10.

Referring to FIGS. 10–12, there is provided a bobbin tube 90 which is swaged at both ends. One end 92 of tube 90 receives a pin connector 88 and the other end 94 receives tip 20. It should be appreciated that end 92 could be swaged to create the pin shape and eliminate the need for pin connector 88. As shown in FIG. 12, bobbin 96 is a thin walled bobbin having a shouldered turned end 97 or a finger turned end 98, illustrated in FIG. 12A. Furthermore, as shown in FIG. 11, bobbin 96 can include flex finger supports 100 at the end thereof which engage shroud 12. The shroud can be further supported by brazing or welding bobbin end 97.

Figure 14C:
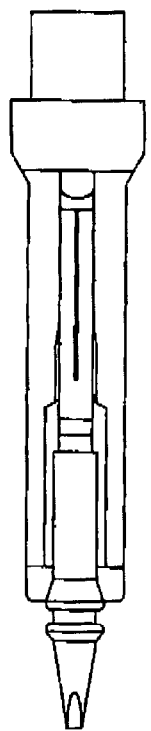
FIG. 14C shows the tip of FIG. 14A inserted in the bobbin of FIG. 14B.
Figure 14A:
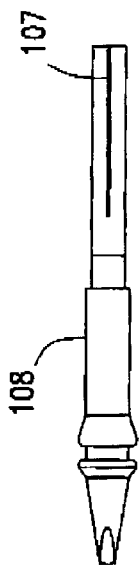
FIGS. 14A & 14B are an elevational view of the tip and sectional view of the bobbin, respectively, of another embodiment of the tip arrangement according to the present invention.
Figure 14B:
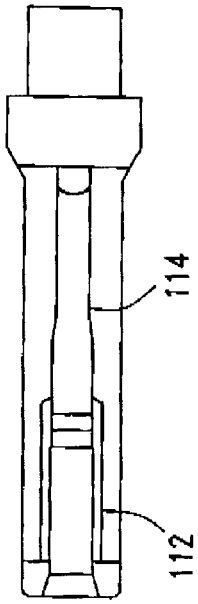
Figure 14D:
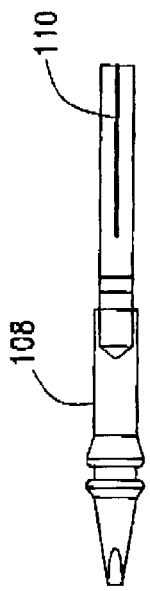
FIG. 14D is a partially broken away vie of the tip of FIG. 14A.
Figure 13C:
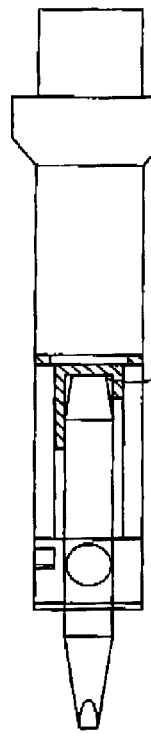
FIGS. 13A–13C are cross-sectional views of still another embodiment of the tip arrangement of the present invention.
Figure 13A:
Figure 13B:
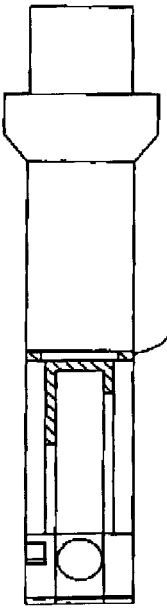

FIGS. 13A–C illustrate a tip assembly wherein tip 102 has an end 104 which engages a contact plate 106 located at the back end of the bobbin. In FIGS. 14A–14B, the tip 108 includes fingers 110, which when inserted into the bobbin 112 and tube 114, expand slightly to engage with tube 114. Tip 108 and fingers 110 can be integral, as shown in FIG. 14A or of two pieces as shown in FIG. 14D.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A self-grounding soldering tip comprising:
    a soldering tip body having a tip portion and a mounting portion; and
    spring means for removably retaining the soldering tip within a heater bobbin of a soldering iron, wherein the spring means has a first end connected to the mounting portion of the soldering tip body and a second end adapted for connecting the soldering tip, in use, to a bobbin tube of the heater bobbin and for providing tip-to-ground continuity.

2. The self-grounding soldering tip of claim 1, wherein the spring means comprises a spring made of a loop of wire, one end of which is secured in the mounting portion of the soldering tip body and a second end of which projects therefrom to provide retention of the tip, in use, in the bobbin tube and a ground connection.

3. The self-grounding soldering tip of claim 2, wherein ends of the loop of wire are held in the mounting portion of the soldering tip body by swaging.

4. The self-grounding soldering tip of claim 2, wherein a closed end of the loop projects axially from an end of the mounting portion in a direction away from the tip portion.

5. A self-grounding soldering tip arrangement, comprising:
    a soldering tip having a mounting portion and a tip portion;
    a heater bobbin having a heater for heating the soldering tip and a bobbin tube extending axially within the heater bobbin; and
    spring means for removably connecting the soldering tip to the bobbin tube with the mounting tip portion of the soldering tip within the bobbin and the tip portion remaining outside thereof, said spring means also providing tip-to-ground continuity for the soldering tip.

6. The self-grounding soldering tip arrangement of claim 5, wherein the bobbin tube and spring means are made of the compatible metals for avoiding reactions as occur between incompatible metals.

7. The self-grounding soldering tip arrangement of claim 5, wherein the spring means comprises a spring made of a loop of wire, ends of the loop being connected to the mounting portion of the soldering tip with a closed end of the loop extending away from the soldering tip; and wherein the loop is compressible for removable reception within the bobbin tube to provide retention of the tip and establishment of a ground connection, said spring and bobbin being adapted to produce a wiping action upon insertion and removal of the loop.

8. The self-grounding soldering tip arrangement of claim 5, wherein the bobbin tube is located remote from the heat source of the heater bobbin for reducing oxidation of the spring and bobbin tube.

9. The self-grounding soldering tip arrangement of claim 5, wherein the bobbin tube includes a plurality of slots for expansion thereof and the spring means comprises a plurality of spring fingers located at a second end thereof, the spring fingers expanding upon insertion into the bobbin tube to removably retain the tip and to establish a ground connection.

10. The self-grounding soldering tip arrangement of claim 5, wherein the spring means comprises a pin extending within the bobbin tube and which is engageable in a tube extending from the mounting portion of the tip.

11. The self-grounding soldering tip arrangement of claim 5, wherein the bobbin tube is swaged at both ends, one end of the bobbin tube receiving the soldering tip and an opposite end receiving a connecting pin.

12. A soldering tool having a replaceable soldering tip, comprising:
    a soldering tip having a tip portion and a mounting portion;
    a heater bobbin having a heater and a bobbin tube extending within the heater bobbin for receiving the mounting portion of the soldering tip; and
    a spring removably retaining the soldering tip within the bobbin, the spring having has a first end connected with the soldering tip and a second end connectable with the bobbin tube, the connection between the spring and bobbin tube providing tip-to-ground continuity.

13. The soldering tool of claim 12, wherein the bobbin tube and spring are made of compatible materials.

14. The soldering tool of claim 13, wherein the spring and bobbin tube are made of stainless steel.

15. The soldering tool of claim 12, wherein the spring comprises a loop of wire, a loop of wire, ends of the spring being connected to the mounting portion of the soldering tip with a closed end of the loop extending away from the soldering tip; and wherein the loop is compressible for removable reception within the bobbin tube to provide retention of the tip and establishment of a ground connection, said spring and bobbin being adapted to produce a wiping action upon insertion and removal of the loop.

16. The soldering tool of claim 13, wherein the connection is at formed a location remote from the heater for minimizing oxidation thereat.

17. The soldering tool of claim 12, wherein the spring comprises a loop of wire, one end of the spring being connected to the mounting portion of the soldering tip; and wherein the loop is compressible for removable reception within the bobbin tube to provide retention of the tip and establishment of a ground connection.

18. The soldering tool of claim 13, wherein the bobbin tube includes a plurality of slots for expansion thereof and the spring comprises a plurality of spring fingers located at its second end, wherein the spring fingers when inserted into the bobbin tube expand to provide retention of the tip and ground connection.

* * * * *